United States Patent
Hebert et al.

(10) Patent No.: US 9,426,156 B2
(45) Date of Patent: Aug. 23, 2016

(54) SYSTEM AND METHOD FOR FACILITATING FEDERATED USER PROVISIONING THROUGH A CLOUD-BASED SYSTEM

(71) Applicant: Intel-GE Care Innovations LLC, Roseville, CA (US)

(72) Inventors: Kevin Hebert, Roseville, CA (US); Jason Smith, Roseville, CA (US); David Martin, Wilsonville, OR (US); Jason Furgison, Tualatin, OR (US)

(73) Assignee: CARE INNOVATIONS, LLC, Roseville, CA (US)

( * ) Notice: Subject to any disclaimer, the term of this patent is extended or adjusted under 35 U.S.C. 154(b) by 81 days.

(21) Appl. No.: 14/083,848

(22) Filed: Nov. 19, 2013

(65) Prior Publication Data
US 2015/0143468 A1 May 21, 2015

(51) Int. Cl.
H04L 29/06 (2006.01)
G06F 21/45 (2013.01)
H04L 29/08 (2006.01)

(52) U.S. Cl.
CPC .............. H04L 63/10 (2013.01); G06F 21/45 (2013.01); H04L 63/06 (2013.01); H04L 67/1002 (2013.01); H04L 67/12 (2013.01); G06F 2221/2117 (2013.01); H04L 63/062 (2013.01)

(58) Field of Classification Search
CPC ..... H04L 63/10; H04L 67/1002; H04L 67/12; H04L 63/06; H04L 63/062; G06F 21/45
USPC .............. 726/4, 2, 7, 9, 26, 28; 713/167, 183, 713/171
See application file for complete search history.

(56) References Cited

U.S. PATENT DOCUMENTS

| 6,823,327 | B1 | 11/2004 | Klug et al. |
| 7,035,813 | B1 * | 4/2006 | Cook ..................... G06Q 20/20 705/14.38 |
| 7,900,247 | B2 | 3/2011 | Chong |
| 8,036,991 | B2 | 10/2011 | Kuhn et al. |
| 8,225,383 | B1 * | 7/2012 | Channakeshava .... H04L 63/083 726/7 |
| 8,775,810 | B1 * | 7/2014 | Snodgrass ................. H04L 9/08 713/175 |
| 8,914,842 | B2 | 12/2014 | Mani et al. |

(Continued)

OTHER PUBLICATIONS

International Search Report of International Application No. PCT/US2014/066361. Dated Feb. 25, 2015. (3 pages).

(Continued)

*Primary Examiner* — David Garcia Cervetti
(74) *Attorney, Agent, or Firm* — Pillsbury Winthrop Shaw Pittman LLP

(57) ABSTRACT

The disclosure relates to systems and methods for provisioning a new user to a cloud-based system through a pre-registration process where the cloud-based system generates a tokenized resource identifier based on the user's registration information provided by an external service provider and through a registration process where the user accesses the cloud-based system using the tokenized resource identifier and the cloud-based system completes the registration of the user when the user's registration information in the cloud-based system is verified against the corresponding registration information maintained by the external service provider. Once the registration is complete, data related to the registered user may be synchronized between the cloud-based system and the external service provider.

18 Claims, 7 Drawing Sheets

(56) References Cited

U.S. PATENT DOCUMENTS

| | | | |
|---|---|---|---|
| 9,001,370 B1* | 4/2015 | Nuggehalli | H04L 63/083 358/1.15 |
| 2001/0034649 A1* | 10/2001 | Acres | G06Q 20/12 705/14.12 |
| 2003/0069844 A1* | 4/2003 | Koren | G06Q 20/10 705/40 |
| 2004/0195311 A1* | 10/2004 | Silverbrook | G06F 3/014 235/375 |
| 2004/0199414 A1* | 10/2004 | Lapstun | G06Q 20/14 235/379 |
| 2004/0204236 A1* | 10/2004 | Lapstun | G06Q 20/14 463/29 |
| 2005/0208940 A1* | 9/2005 | Takase | H04L 67/30 455/435.1 |
| 2005/0216300 A1* | 9/2005 | Appelman | G06Q 10/10 705/319 |
| 2006/0206932 A1 | 9/2006 | Chong | |
| 2008/0033959 A1* | 2/2008 | Jones | G06F 17/30699 |
| 2008/0148057 A1* | 6/2008 | Hauw | G06F 21/34 713/185 |
| 2009/0006183 A1* | 1/2009 | Paintin | G06Q 30/02 705/7.29 |
| 2009/0092253 A1* | 4/2009 | Asipov | H04L 9/083 380/278 |
| 2009/0164579 A1* | 6/2009 | Chaudhry | H04L 63/08 709/205 |
| 2009/0279682 A1* | 11/2009 | Strandell | H04L 63/18 379/201.02 |
| 2009/0300735 A1* | 12/2009 | Wiesinger | G11B 20/00086 726/5 |
| 2010/0100946 A1* | 4/2010 | Hallam-Baker | H04L 63/08 726/5 |
| 2010/0167734 A1* | 7/2010 | Jones | H04L 29/12622 455/435.1 |
| 2010/0169217 A1 | 7/2010 | Kuhn et al. | |
| 2010/0281522 A1* | 11/2010 | Hatakeyama | G06F 21/33 726/4 |
| 2011/0044264 A1* | 2/2011 | Chen | H04W 36/245 370/329 |
| 2011/0098030 A1* | 4/2011 | Luoma | H04M 3/42153 455/419 |
| 2011/0106593 A1* | 5/2011 | Schoenberg | G06Q 30/02 705/14.1 |
| 2011/0131638 A1* | 6/2011 | Kan | G06F 21/43 726/6 |
| 2011/0314290 A1* | 12/2011 | Fort | G06F 21/31 713/176 |
| 2012/0061458 A1* | 3/2012 | Bahr | G06K 7/10792 235/375 |
| 2012/0066752 A1* | 3/2012 | Vysogorets | G06F 21/34 726/7 |
| 2012/0066756 A1* | 3/2012 | Vysogorets | G06F 21/34 726/9 |
| 2012/0066757 A1* | 3/2012 | Vysogorets | G06F 21/34 726/9 |
| 2012/0078782 A1* | 3/2012 | Schoenberg | G06Q 20/102 705/40 |
| 2012/0101896 A1* | 4/2012 | Veeneman | G06Q 30/0251 705/14.49 |
| 2012/0122437 A1* | 5/2012 | Zimmerman | H04W 8/22 455/414.3 |
| 2012/0157062 A1* | 6/2012 | Kim | G06Q 30/0601 455/414.1 |
| 2012/0167185 A1* | 6/2012 | Menezes | H04L 9/3213 726/5 |
| 2012/0173322 A1* | 7/2012 | Ringewald | G06Q 20/027 705/14.16 |
| 2012/0220268 A1* | 8/2012 | Smith | H04L 12/5815 455/411 |
| 2012/0239723 A1* | 9/2012 | Noguchi | H04L 63/08 709/201 |
| 2012/0271770 A1* | 10/2012 | Harris | G06Q 40/00 705/67 |
| 2012/0282893 A1* | 11/2012 | Kim | G06Q 20/3224 455/406 |
| 2012/0291114 A1* | 11/2012 | Poliashenko | G06F 21/41 726/8 |
| 2013/0047247 A1* | 2/2013 | Matsuda | G06F 21/335 726/9 |
| 2013/0066660 A1* | 3/2013 | Kopitzke | G06Q 10/02 705/5 |
| 2013/0086141 A1* | 4/2013 | Saldhana | G06F 21/335 709/203 |
| 2013/0097682 A1* | 4/2013 | Zeljkovic | H04L 9/3231 726/7 |
| 2013/0145172 A1* | 6/2013 | Shablygin | G06F 21/33 713/185 |
| 2013/0145173 A1* | 6/2013 | Shablygin | G06F 21/34 713/185 |
| 2013/0145447 A1 | 6/2013 | Maron | |
| 2013/0160099 A1* | 6/2013 | Fitzpatrick, III | H04L 9/3213 726/7 |
| 2013/0167244 A1* | 6/2013 | Turk | G06Q 10/0635 726/26 |
| 2013/0191878 A1 | 7/2013 | Mani et al. | |
| 2013/0191929 A1* | 7/2013 | Yin | G06F 21/31 726/28 |
| 2013/0226686 A1* | 8/2013 | Grossman | G06Q 30/02 705/14.27 |
| 2013/0244614 A1* | 9/2013 | Santamaria | H04L 51/04 455/411 |
| 2013/0312111 A1* | 11/2013 | Carlson | G06F 21/00 726/27 |
| 2013/0315155 A1* | 11/2013 | Foti | H04W 72/0406 370/329 |
| 2014/0019217 A1* | 1/2014 | Eliscu | G06Q 30/02 705/14.1 |
| 2014/0067503 A1* | 3/2014 | Ebarle Grecsek | G06Q 30/0222 705/14.23 |
| 2014/0114672 A1* | 4/2014 | Wright | G06Q 50/24 705/2 |
| 2014/0122349 A1* | 5/2014 | Takatsu | G06Q 30/018 705/317 |
| 2014/0130145 A1* | 5/2014 | Yeleswarapu | H04L 61/30 726/9 |
| 2014/0137232 A1* | 5/2014 | Kobayashi | H04L 63/10 726/17 |
| 2014/0157434 A1* | 6/2014 | Graves | G06F 15/16 726/28 |
| 2014/0160512 A1* | 6/2014 | Mori | H04N 1/00838 358/1.14 |
| 2014/0237235 A1* | 8/2014 | Kuno | H04L 9/0866 713/165 |
| 2014/0237580 A1* | 8/2014 | Kato | H04L 63/08 726/9 |
| 2014/0258123 A1* | 9/2014 | Fernandes | G06Q 40/025 705/44 |
| 2014/0289118 A1* | 9/2014 | Kassemi | G06Q 20/02 705/44 |
| 2014/0304837 A1* | 10/2014 | Mogaki | G06F 21/33 726/28 |
| 2014/0344153 A1* | 11/2014 | Raj | G06Q 20/3821 705/44 |
| 2014/0365781 A1* | 12/2014 | Dmitrienko | G06F 21/34 713/185 |
| 2014/0372528 A1* | 12/2014 | Nishiguchi | H04L 47/70 709/204 |
| 2014/0373099 A1* | 12/2014 | Durbha | H04L 63/10 726/4 |
| 2014/0380428 A1* | 12/2014 | Kobayashi | G06F 21/335 726/4 |
| 2015/0029535 A1* | 1/2015 | Kondoh | G06F 21/608 358/1.14 |
| 2015/0036167 A1* | 2/2015 | Naitoh | G06F 3/1238 358/1.14 |
| 2015/0040188 A1* | 2/2015 | Takeuchi | H04L 63/08 726/3 |
| 2015/0066766 A1* | 3/2015 | Wittenburg | G06F 21/41 705/44 |
| 2015/0074395 A1* | 3/2015 | Chang | H04L 63/08 713/168 |

(56) References Cited

U.S. PATENT DOCUMENTS

| | | | | |
|---|---|---|---|---|
| 2015/0074408 A1* | 3/2015 | Oberheide | .............. | H04L 9/083 713/171 |
| 2015/0089623 A1* | 3/2015 | Sondhi | .................... | H04L 63/08 726/9 |
| 2015/0100483 A1* | 4/2015 | Schoenberg | ........... | G06Q 10/10 705/40 |
| 2015/0121540 A1* | 4/2015 | Citron | .................. | G06Q 50/184 726/27 |

OTHER PUBLICATIONS

International Preliminary Report on Patentability issued May 24, 2016 in International Application PCT/US2014/066361.

* cited by examiner

PRE-REGISTRATION PAGE 500

ACTIVATION KEY
510

DATE OF BIRTH
520

EMAIL ADDRESS
530

SUBMIT
550

FIG. 5

REGISTRATION PAGE 600

DATE OF BIRTH
620

SUBMIT
650

FIG. 6

SYSTEM AND METHOD FOR FACILITATING FEDERATED USER PROVISIONING THROUGH A CLOUD-BASED SYSTEM

FIELD OF THE INVENTION

The disclosure relates to systems and methods for facilitating federated user provisioning through a cloud-based system.

BACKGROUND OF THE INVENTION

Patients and clinicians share and monitor patients' health information by logging into and using a service provided by a clinical application. Typically, a new user should be registered directly with the clinical application to be able to access the clinical application. However, various limitations exist with respect to how a large number of users can be effectively and simultaneously registered with the clinical application.

Cloud computing involves large groups of computing devices that are networked through a communication network such as the Internet so as to allow sharing virtualized computing resources such as servers, networks, data storage space, and software among multiple users. The cloud computing focuses on optimizing the utilization of the shared resources by dynamically allocating and re-allocating the shared resources based on changes in demand. Thus, a system built in a cloud environment can support virtually unlimited number of end users even during peak load periods.

As such, what is needed is to be capable of facilitating federated user provisioning through a cloud-based system. These and other problems exist.

SUMMARY OF THE INVENTION

One aspect of the disclosure relates to systems and methods for facilitating federated user provisioning through a cloud-based system. The provisioning of the new user may be initiated by an external service provider which receives registration information associated with the new user. The received registration information may be transmitted from the external service provider to the cloud-based system.

During a pre-registration process, the cloud-based system may generate a tokenized resource identifier unique to the user based on the user's registration information provided by the external service provider. During a registration process, the user accesses the cloud-based system using the tokenized resource identifier, and the cloud-based system completes the registration when the user's registration information in the cloud-based system is verified against the corresponding registration information maintained by the external service provider. Once the registration is complete, data related to the registered user may be synchronized between the cloud-based system and the external service provider.

In one embodiment, there is provided a non-transitory computer readable medium storing computer-readable instructions that, when executed by one or more processors of a cloud server, cause the cloud server to: obtain, by a pre-registration module, registration information associated with a user, wherein the registration information comprises an activation key; generate, by the pre-registration module, a tokenized resource identifier based on the registration information, the tokenized resource identifier identifying the location of one or more resources in the cloud server, wherein the tokenized resource identifier comprises a pre-registration token that is used to grant access to the one or more resources in the cloud server; provide, by the pre-registration module, the tokenized resource identifier to the user; obtain, by a registration module, the pre-registration token embedded in the tokenized resource identifier; determine, by the registration module, whether to grant access to the one or more resources based on the pre-registration token; grant, by the registration module, access to the one or more resources based on the determination that access to the one or more resources should be granted based on the pre-registration token; and register, by the registration module, the user with the cloud server using the one or more resources.

In another embodiment, there is provided a method implemented in a computer that includes one or more processors configured to execute one or more computer program instructions. The method comprises: obtaining registration information associated with a user; generating an activation key associated with the user based on the registration information; obtaining a tokenized resource identifier that identifies the location of one or more resources in a cloud server, wherein the tokenized resource identifier comprises a pre-registration token that is used to grant access to the one or more resources in the cloud server, the pre-registration token comprising the activation key; and providing the tokenized resource identifier to the user.

In another embodiment, there is provided a method implemented in a computer that includes one or more processors configured to execute one or more computer program instructions, the method comprising: obtaining at least a portion of a first user record associated with a user, wherein the at least a portion of the first user record comprises an activation key generated by an external service provider; generating a second user record based on the at least a portion of the first user record; generating a tokenized resource identifier based on the activation key, the tokenized resource identifier identifying the location of one or more resources in a cloud server, wherein the tokenized resource identifier comprises a pre-registration token that is used to grant access to the one or more resources in the cloud server; providing the tokenized resource identifier to the user; granting access to the user who uses the tokenized resource identifier to access the one or more resources in the cloud server; providing at least a portion of the second user record to the external service provider to verify the at least a portion of the second user record against the first user record stored in a data storage coupled to the external service provider; receiving an indication that the at least a portion of the second user record has been verified against the first user record; and registering the user with the cloud server based on the indication.

Other objects and advantages of the invention will be apparent to those skilled in the art based on the following drawings and detailed description. It also is to be understood that both the foregoing general description and the following detailed description are exemplary and not restrictive of the scope of the embodiments.

BRIEF DESCRIPTION OF THE DRAWINGS

FIG. 5 illustrates a screenshot of an interface for pre-registering a user with a cloud-based system, according to an aspect of the invention.

FIG. 6 illustrates a screenshot of an interface for registering a user with a cloud-based system, according to an aspect of the invention.

DETAILED DESCRIPTION OF THE INVENTION

Figure 1:
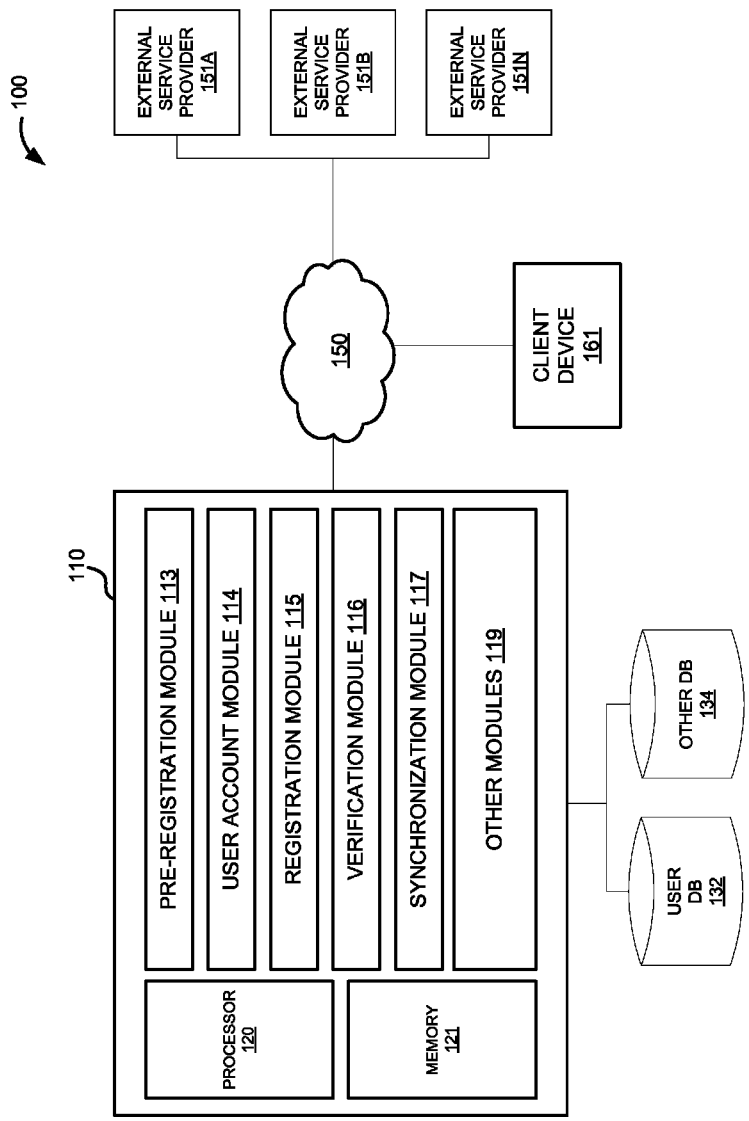
FIG. 1 illustrates a system for registering a user with a cloud-based system, according to an aspect of the invention.

One aspect of the disclosure relates to systems and methods for facilitating federated user provisioning through a cloud-based system. Provisioning of a new user may be initiated by an external service provider which receives registration information associated with the new user. The registration information may be entered into the external service provider by, for example, a patient, a clinician, an administrator, and/or other users via an interface of the external service provider. The received registration information may be transmitted from the external service provider to the cloud-based system. During a pre-registration process, the cloud-based system may generate a tokenized resource identifier unique to the user based on the user's registration information provided by the external service provider. During a registration process, the user accesses the cloud-based system using the tokenized resource identifier, and the cloud-based system completes the registration when the user's registration information in the cloud-based system is verified against the corresponding registration information maintained by the external service provider. Once the registration is complete, data related to the registered user may be synchronized between the cloud-based system and the external service provider.

The "cloud-based system" (used interchangeably with "cloud," "cloud server," and "server" herein) may comprise a web application running in a cloud environment and/or cloud resources. In some embodiments, the cloud-based system may be used as a cloud-based medical system that creates, gathers, maintains, and/or manages health/medical information and/or other information related to patients. For example, the cloud-based system will capture, store, and/or retrieve health measurements and assessments, and/or other health data and make them available to registered patients who are authorized to access the health data.

The web-based application may comprise a web portal and/or one or more applets. A user (e.g., patient) may interact with the cloud-based system by accessing the web portal via a web browser from a client device. The client device may include a mobile device and/or one or more computing devices (e.g., specialty computing systems, desktop computers, personal computers, mobile computing devices, tablet computing devices, smart-phones, or other computing devices). The user may, via the web portal, instruct the web application to perform one or more functionalities including: registering, logging on, configuring and managing workspace and account, configuring and managing calendar and notification, performing health sessions, reviewing clinical content, and/or taking measurements (e.g., blood pressure, weight, etc.) with medical peripherals. For example, the web portal may provide a pre-registration page (as illustrated in FIG. 5) for pre-registering a new user with the cloud-based system and a registration page (as illustrated in FIG. 6) that is used to complete the registration process. The web portal may also provide administrative and operations interfaces to system administrators.

These functionalities and/or other functionalities of the web application may be provided and/or supported by the one or more applets. An applet is a set of features providing a cohesive set of functionality. The one or more applets include, for example, a calendar and notification applet (e.g., creating, receiving, viewing, and/or managing calendar events, assigning participants to the calendar event, generating and/or sending alerts/notifications, etc.), contacts manager applet (e.g., entering, editing, viewing, and deleting contacts), measurements applet (e.g., capturing and/or obtaining vital sign measurements from one or more medical peripheral devices), health assessments applet (e.g., creating, viewing, and/or managing a health session during which various health measurements may be taken and health assessments may be conducted, accessing a session summary and/or detailed session history, creating, sending, and/or managing reminders for the health session, requesting Protected Health Information (PHI) view, etc.), medications applet (e.g., creating, editing, and deleting medications, setting calendar reminders for medications and tasks for medication refills), workspace/account manager applet (e.g., creating personal or group workspace for use by registered users, managing user accounts, profiles, workspace membership, access permissions, etc.), learn more applet (e.g., accessing clinical content) and/or other applets.

The cloud-based system may run in a public cloud, a private cloud, and/or a hybrid cloud. The cloud-based system may communicate with one or more external services or devices via various communication protocols (e.g., HTTP, SMS, SMTP, IMAP, POP, FAX, etc.).

The "external service provider" may comprise an external application that may communicate and/or exchange data with the cloud-based system. In some embodiments, the external service provider may register a new user through the cloud-based system. For example, the external service provider may obtain registration information of a new user (e.g., patient) and transmit the registration information to the cloud-based system to register the user with the cloud-based system. As such, the registered user and/or other authorized users may have access to the registered user's user records available at the external service provider and/or the cloud-based system.

In some embodiments, the external service provider may be a clinical application typically used by a patient, a clinician, care giver, doctor, nurse, and/or other users involved in patient care. The clinical application may be used to access patient records and associated health data, schedule patient health sessions, set reminders for patients, and/or assess treatment progress for patients. In some embodiments, the external application may be a web-based application providing a web interface through which users may interact with the external service provider.

The "user record" may comprise the registration information, user preferences, health/medical information (e.g., vital measurements, health assessments, etc.), calendar information, and/or other information related to the user. The registration information may comprise an activation key that uniquely identifies the user to be registered, contact information (e.g., an email address, a phone number, a mailing address, etc.), personal information (e.g., a date of birth (DOB), a social security number (SSN), etc.), insurance information, and/or other information known about or received from the user.

Other implementations and uses of the system will be apparent based on the disclosure herein. Having provided a broad overview of a use of the system, various system components will now be described.

FIG. 1 illustrates a system 100 for registering a user with a cloud-based system, according to an aspect of the invention. In some embodiments, system 100 may include a cloud server 110, external service providers 150 (illustrated in FIG. 1 as external service provider 151A, 151B, . . . , 151N), a client device 161, a user database 132, other databases 134, a network 150, and/or other components.

In some embodiments, server 110 may include one or more computers programmed to execute computer program modules. Through these program modules, server 110 may pre-register a new user when registration information associated with the new user is received from external service provider 151, create a user record based on the registration information, generate a tokenized resource identifier based on the registration information, provide the tokenized resource identifier to the user via email, obtaining an activation key embedded in the tokenized resource identifier when the new user accesses server 110 using the tokenized resource identifier, registering the new user with server 110 after verifying the user record against a corresponding user record at external service provider 151, and/or perform other functions. For example, server 110 may include a pre-registration module 113, a user account module 114, a registration module 115, a verification module 116, a synchronization module 117, and/or other modules 119 for performing the functions described herein.

In some embodiments, pre-registration module 113 may be configured to pre-register a new user (e.g., patient) based on registration information associated with the user. The registration information may comprise an activation key that uniquely identifies the user to be registered, contact information (e.g., an email address, a phone number, a mailing address, etc.), personal information (e.g., a date of birth (DOB), a social security number (SSN), etc.), insurance information, and/or other information known about or received from the user. In some embodiments, pre-registration module 113 may display, via a user interface, a pre-registration page that receives one or more data elements of the registration information.

In some embodiments, pre-registration module 113 may obtain the registration information from external service provider 151. In these embodiments, external service provider 151 may obtain registration information about the new user and/or creates a first user record associated with the user. For example, a clinician (or any other user involved in patient care) may provide registration information about the new patient including contact information, personal information, insurance information, and/or other information by entering the registration information into external service provider 151. External service provider 151 may create and/or generate the first user record associated with the user based on the registration information received. External service provider 151 may generate an activation key that uniquely identifies the user. The first user record including the registration information received and/or the activation key generated may be stored in a data storage coupled to external service provider 151.

The registration information including the activation key may be provided to pre-registration module 113 in order to pre-register the user with server 110. In some embodiments, the registration information (or any portion thereof) may be automatically transmitted to server 110. Once the registration information is entered into external service provider 151, external service provider 151 may provide an option to transmit the registration information (or any portion thereof) to server 110. Once pre-registration module 113 receives the registration information from external service provider 151, the registration information may be used to create a second user record associated with the new user where the second user record may be stored in user database 132 and/or other databases 134.

In some embodiments, the registration information (or any portion thereof) may be entered into server 110 via the pre-registration page. In one example, the registration information (or any portion thereof) may be entered into the pre-registration page by manual input. In this example, the activation key that has been generated by external service provider 151 may be manually copied and pasted into the pre-registration page presented by pre-registration module 113. The pre-registration page may require the new user's DOB, an email address, and/or other registration information. In another example, the pre-registration page may be pre-populated with the registration information that has been transmitted from external service provider 151.

Once all of the required information have been entered into the pre-registration page or otherwise provided to pre-registration module 113, user account module 114 may be configured to create a second user record associated with the new user based on the registration information obtained, wherein a status associated with the second user record may indicate that the registration is incomplete (e.g., "pre-registered," "incomplete," "pending," "not activated," etc.). The status may be updated (e.g., changed to "complete," "activated," etc.) by user account module 114 once the registration is fully completed via registration module 115. User account module 114 may store the second user record including the obtained registration information in user database 132 and/or other databases 134.

In some embodiments, pre-registration module 113 may be configured to generate a tokenized resource identifier (e.g., tokenized Uniform Resource Identifier (URI)) based on the registration information obtained. The tokenized resource identifier may identify the location of one or more resources in server 110. For example, the tokenized resource identifier may include a uniform resource locator (URL) for a registration page displayed, via a user interface, by registration module 115 where the registration page may be used to complete the registration process. The tokenized resource identifier may comprise a pre-registration token that may be used to grant access to the one or more resources (e.g., the registration page) in server 110. Pre-registration module 113 may generate the pre-registration token based on the activation key and/or embed the token in the resource identifier to create the tokenized resource identifier.

Figure 7:
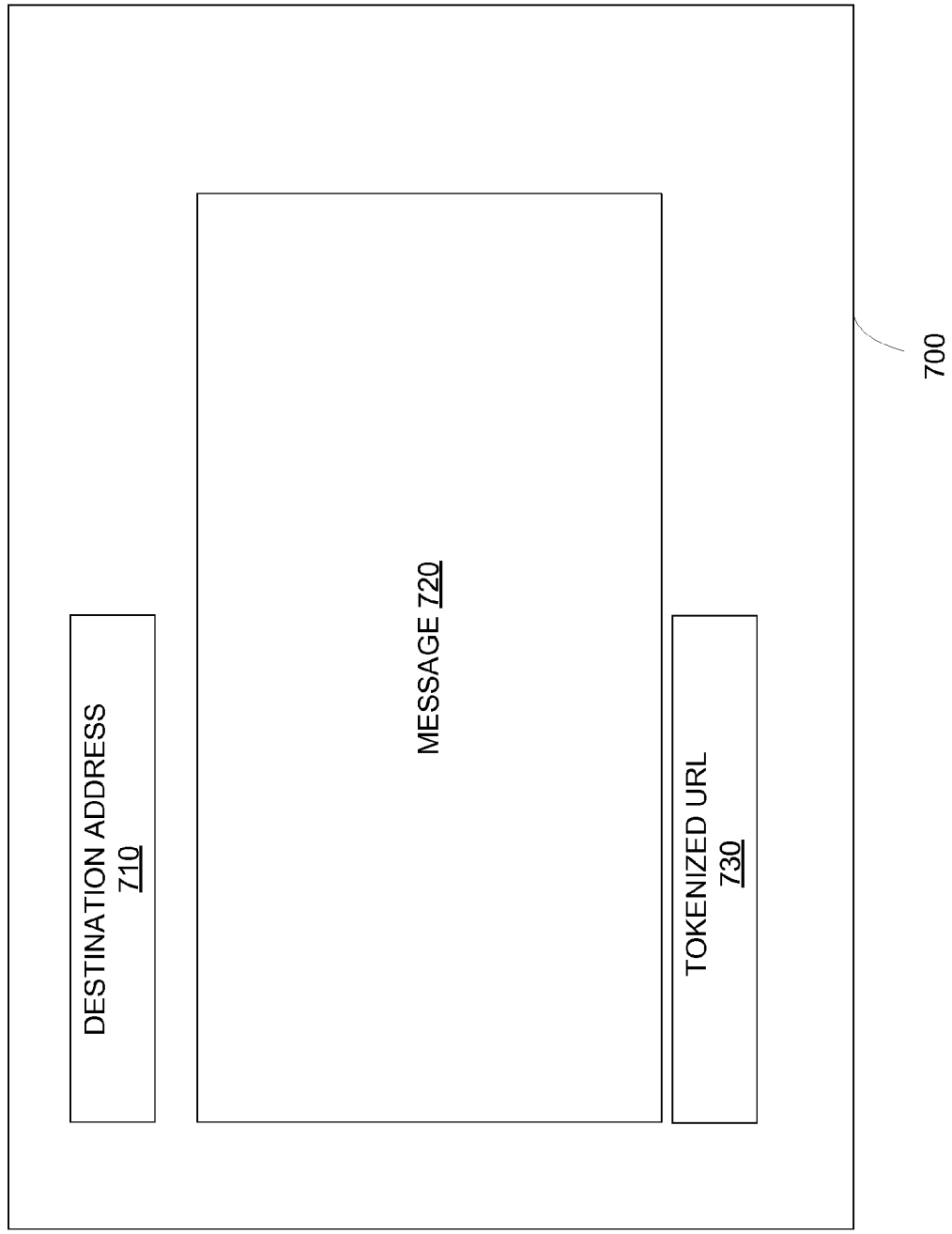
FIG. 7 illustrates a screenshot of a registration invitation inviting the user to register with the cloud-based system, according to an aspect of the invention.

In some embodiments, pre-registration module 113 may provide the tokenized resource identifier to the new user. In some embodiments, pre-registration module 113 may transmit the tokenized resource identifier to external service provider 151 which provided the registration information to pre-register the user with server 110. External service provider 151 may generate a registration invitation (as illustrated in FIG. 7) that may include the tokenized resource identifier and/or a message instructing a recipient of the registration invitation to register with server 110. External service provider 151 may retrieve the contact information (e.g., email address) from the first user record and/or transmit, via a communication channel, the registration invitation from external service provider 151 to the user based on the contact information. In other embodiments, pre-registration module 113 may generate the registration invitation, retrieve the contact information from the second user record, and/or transmit, via a communication channel, the registration invitation from server 110 to the user based on the contact information.

The registration invitation may be generated in various formats: email, SMS/MMS message, voice message, letter, fax, etc. Based on the format of the registration invitation, a particular type of contact information may be selected and/or retrieved from the first or second user record. For example, the registration invitation may be generated in an email format and transmitted (e.g., via a SMTP server) to the email address associated with the user. In another example, the registration invitation may be sent as a text message to the phone number associated with the user. When the prospective user receives the registration invitation, the user may click on the tokenized URL included in the invitation and/or may be redirected to the location of one or more resources (e.g., the registration page) in server 110 to complete the registration process. The tokenized URL may also be directly entered into a web browser's address bar.

In some embodiments, registration module 115 may be configured to obtain the pre-registration token that is embedded in the tokenized resource identifier. The embedded pre-registration token representing the activation key may be used to authenticate the user to the one or more resources. Registration module 115 may determine whether to grant access to the one or more resources based on the pre-registration token. In doing so, registration module 115 may verify that the pre-registration token is the one that has been generated by pre-registration module 113 for the user. Registration module 115 may grant access to the one or more resources based on the determination that access to the one or more resources should be granted. Once access is granted, registration module 115 may display the one or more resources (e.g., registration page) via a user interface.

In some embodiments, registration module 115 may be configured to register the user with server 110 using the one or more resources. The registration page may require the user to enter a particular portion of the registration information (such as his/her DOB, SSN, a phone number, an email address, an address, and/or other information that is unknown or not readily available to people other than the user) to ensure that the user entering the information is the correct user that should be registered. For example, the user may be asked to type in his/her DOB through the registration page. Registration module 115 may determine whether the DOB matches the DOB stored in the second user record. In some embodiments, if the DOB matches the DOB stored in the second user record, then the user may be directed to a password page where the user may enter and/or confirm a new password for the login. If the DOB does not match the second user record, an error message may be generated and communicated to the user via the user interface.

In some embodiments, once the entered portion of the registration information has been verified against the second user record, the registration information in the second user record may be fully committed to user database 132 and/or the status associated with the second user record may be updated to indicate that the registration has been completed (e.g., the status changed to "completed," "activated," etc.).

In some embodiments, verification module 116 may be configured to provide at least a portion of the second user record to external service provider 151 to verify the at least a portion of the second user record against a corresponding portion of the first user record stored at external service provider 151. Verification module 116 may identify external service provider 151 that has generated the activation key. For example, an URL of external service provider 151 may be identified and/or obtained. External service provider 151 may receive the at least a portion of the second user record and/or determine whether the at least a portion of the second user record matches a corresponding portion of the first user record. Once verified, external service provider 151 may generate an indication that the second user record has been verified against the first user record and/or transmit the indication to server 110. Verification module 116 may receive the indication and/or complete the registration process in response to receiving the indication from external service provider 151. The status associated with the second user record may be updated to indicate that the registration has been completed (e.g., the status changed to "completed," "activated," etc.) based on this indication.

Upon the completion of the registration process, registration module 116 may send a message confirming the completion of the registration to the user in the form of an email, an SMS/MMS message, a voice message, or any other suitable data transmission mechanism or communication format.

In some embodiments, synchronization module 117 may associate and/or pair the second user record with the first user record and/or store the association along with the second user record in user database 132 and/or other databases 134 such that the two records may be synchronized based on this association. In some embodiments, the association may be established and/or stored based on receiving the indication that the second user record has been successfully verified against the first user record from external service provider 151. In some embodiments, the association between the first user record and second user record may established at external service provider 151 and/or stored in a data storage coupled to external service provider 151. In some embodiments, the association may be established and/or stored based on verifying that the second user record has been successfully verified against the first user record.

In some embodiments, external service provider 151 may generate a shared secret that may be used to establish a secure communication between server 110 and external service provider 151. The secure communication established between server 110 and external service provider 151 may be bi-directional. The shared secret may be transmitted or otherwise provided to server 110. In some embodiments, synchronization module 117 may be configured to obtain the shared secret from external service provider 151.

In some embodiments, synchronization module 117 may be configured to synchronize the associated user records between server 110 and external service providers 151 via the secure communication established based on the shared secret. For example, health sessions and reminders that have been assigned by clinicians to a particular patient via external service provider 151 may be imported by synchronization module 117 to server 110 if the user record of the particular patient has an association with a corresponding user record in user database 132. In another example, a particular patient may take vital sign measurements and health assessments via the web portal presented by server 110. The measurements and assessments may be uploaded to one or more external service providers 151 that have a user record associated with the particular patient in question.

In some embodiments, synchronization module 117 may synchronize one or more data elements or all of the data elements of the associated user records. User records may contain static data (e.g., name, DOB, SSN, contact information, and/or other information that are not frequently added, updated, and/or deleted) and/or dynamic data (e.g., health sessions, reminders, measurements, assessments, calendar, and/or other information that are frequently added, updated, and/or deleted). In some embodiments, synchronization module 117 may obtain a selection of one or more data elements that should be synchronized and/or synchronize only the selected data elements in order to minimize overly-frequent synchronization updating and in turn save resources for data transmission. For example, a user (e.g., patient, clinician, system administrator, or other user) may select one or more dynamic data elements such as health sessions and measurements to be synchronized while excluding less-frequently updated or static data elements such as name, DOB, SSN, contact information, etc.

In some embodiments, the synchronization between the associated user records (or the selected data elements thereof) may be performed at user request, periodically, and/or when changes have been made to the user records or the selected data elements thereof.

Other uses and implementations of server 110 will be apparent to those having skill in the art based on the disclosure herein. Having provided an overview of implementations and components of server 110, various other components of system 100 will now be described.

In some embodiments, server 110 may include or otherwise access various databases to store and/or retrieve information. The various databases may include, for example, user database 132, and/or other databases 134. User database 132 may store registration information received during the pre-registration/registration process and/or other information known or obtained about a user. In some embodiments, user database 132 may store the information related to calendar events, alerts/notifications, reminders, health sessions, measurements, workspace, membership, access permissions, clinical content, etc. The information may be stored as a user record associated with the user. The user record or any portion thereof may be created, added, modified, and/or updated.

In some embodiments, client devices 161 may each be or may include a mobile device, one or more computing devices (e.g., specialty computing systems, desktop computers, personal computers, mobile computing devices, tablet computing devices, smart-phones, or other computing devices) having one or more processors (e.g., microprocessors), memory devices (e.g., hard disk, RAM, EEPROM, etc.), input/output components, and/or other computing components for performing the features and functions described herein (and/or other features and functions). Each of the foregoing devices may have one or more user interfaces such as a keypad, a display, a voice recognition microphone and speaker to interact with a user. In some embodiments, each of the foregoing devices comprises a processor coupled to a memory over a bus to carry out the features and functionalities of the embodiments described herein. In some embodiments, each of the foregoing devices comprises one or more computer program modules residing in the memory thereof and generating a display that is displayed to the user via the display. Each of the foregoing devices may have an antenna to wirelessly communicate with other components of system 100 over network 150 or independent of network 150.

In some embodiments, network 150 may be or include a communications network capable of supporting one or more modes of communications, including but not limited to, wireless, wired, and optical communications. For example, network 150 may comprise cell phone towers or other wireless communication infrastructure, public switched telephone networks (PSTN), active and passive optical networks, and combinations thereof. Examples of such networks may include computer implemented networks such as the Internet, a local area network (LAN), a wide area network (WAN), etc.

The databases 132 and/or 134, and/or other data storages described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The foregoing description of the various components comprising system 100 is exemplary only, and should not be viewed as limiting. The invention described herein may work with various system configurations. Accordingly, more or less of the aforementioned system components may be used and/or combined in various implementations.

Figure 2:
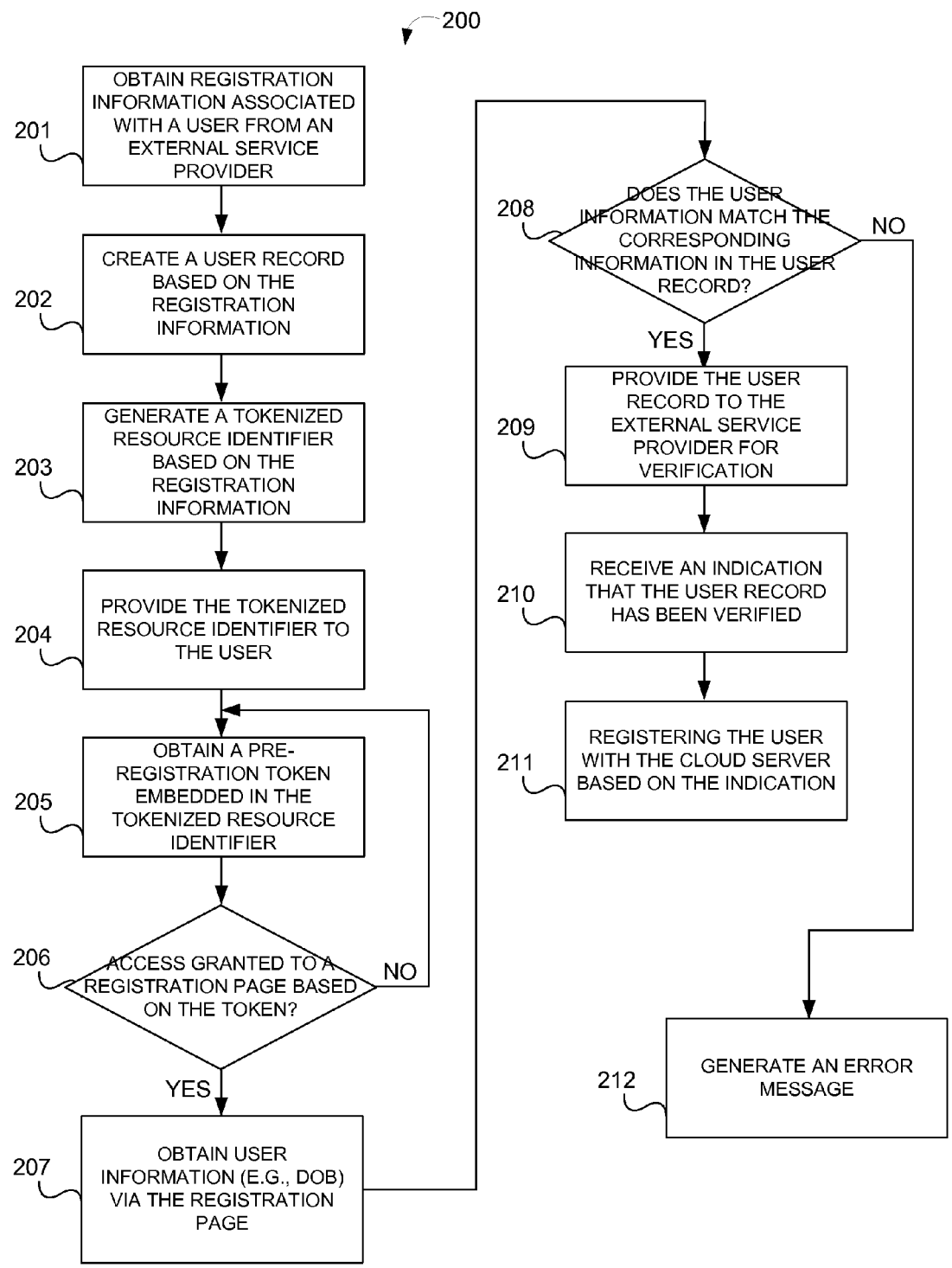
FIG. 2 illustrates a process for registering a user with a cloud-based system, according to an aspect of the invention.

FIG. 2 illustrates a process 200 for registering a user with a cloud-based system, according to an aspect of the invention. The various processing operations and/or data flows depicted in FIG. 2 (and in the other drawing Figures) are described in greater detail herein. The described operations may be accomplished using some or all of the system components described in detail above and, in some embodiments, various operations may be performed in different sequences. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 201, process 200 may include obtaining registration information associated with a user. The registration information may comprise an activation key that uniquely identifies the user to be registered, contact information (e.g., an email address, a phone number, a mailing address, etc.), personal information (e.g., a date of birth (DOB), a social security number (SSN), etc.), insurance information, and/or other information known about or received from the user. The registration information may be obtained from external service provider 151.

In an operation 202, process 200 may include creating a user record associated with the user based on the registration information. The user record may be stored in user database 132 and/or other databases 134. A status associated with the user record may indicate that the registration is incomplete (e.g., "pre-registered," "incomplete," "pending," "not activated," etc.). The status may be updated (e.g., changed to "complete," "activated," etc.) once the registration is fully completed.

In an operation 203, process 200 may include generating a tokenized resource identifier based on the registration information obtained. The tokenized resource identifier may identify the location of one or more resources in server 110. For example, the tokenized resource identifier may include a URL for a registration page displayed, via a user interface, by registration module 115 where the registration page may be used to complete the registration process. The tokenized resource identifier may comprise a pre-registration token that may be used to grant access to the one or more resources (e.g., the registration page) in server 110. The pre-registration token may be generated based on the activation key and/or embedded in the resource identifier to create the tokenized resource identifier.

In an operation 204, process 200 may include providing the tokenized resource identifier to the user. In some embodiments, the tokenized resource identifier may be transmitted to external service provider 151 which provided the registration information to pre-register the user with server 110. External service provider 151, in response to receiving the tokenized resource identifier, may generate a registration invitation that may include the tokenized resource identifier and/or a message instructing a recipient of the registration invitation to register with server 110. In one example, the registration may be generated in an email format and sent to the email address associated with the user. When the prospective user receives the registration invitation, the user may click on the tokenized URL included in the invitation and/or may be redirected to the location of one or more resources (e.g., the registration page) in server 110 to complete the registration process.

In an operation 205, process 200 may include obtaining the pre-registration token that is embedded in the tokenized resource identifier. The pre-registration token can be obtained when the user tries to access the one or more resources (e.g., the registration page) using the tokenized URL. The embedded pre-registration token representing the activation key may be used to authenticate the user to the one or more resources.

In an operation 206, process 200 may include determining whether to grant access to the one or more resources based on the pre-registration token. In making this determination, process 200 may verify that the pre-registration token obtained in operation 205 is the one that has been generated in operation 203 for the user. Once access is granted, the one or more resources (e.g., registration page) may be displayed via a user interface.

If process 200 determines that the access should be granted based on the pre-registration token obtained in operation 205, process 200 may proceed to an operation 207. In operation 207, process 200 may include obtaining user information such as DOB via the one or more resources. The one or more resources such as the registration page may require the user to enter a particular portion of the registration information (such as his/her DOB, SSN, a phone number, an email address, an address, and/or other information that is unknown or not readily available to people other than the user) to ensure that the user entering the information is the correct user that should be registered. For example, the user may be asked to type in his/her DOB through the registration page.

However, if process 200 determines that the access should be denied because the pre-registration token obtained in operation 205 does not match the token generated in operation 203 or any of the tokens generated by server 110 for other new users, process 200 may return to operation 205.

In an operation 208, process 200 may include determining whether the DOB matches the DOB stored in the user record. If process 200 determines that the DOB matches the DOB stored in the user record, process 200 may proceed to an operation 209. In operation 209, process 200 may include providing at least a portion of the user record to external service provider 151 to verify the at least a portion of the user record against a corresponding user record stored in a data storage coupled to external service provider 151.

However, if process 200 determines that the DOB does not match the DOB stored in the user record, process 200 may proceed to an operation 212 in which process 200 may generate an error message and/or communicate to the user via the user interface.

Once verified, external service provider 151 may generate an indication that the user record has been verified against the corresponding user record and/or transmit the indication to server 110. In an operation 210, process 200 may include receiving the indication from external service provider 151. In an operation 211, process may include registering the user with server 110 in response to receiving the indication and thus completing the registration process. The status associated with the second user record may be updated to indicate that the registration has been completed (e.g., the status changed to "completed," "activated," etc.).

Figure 3:
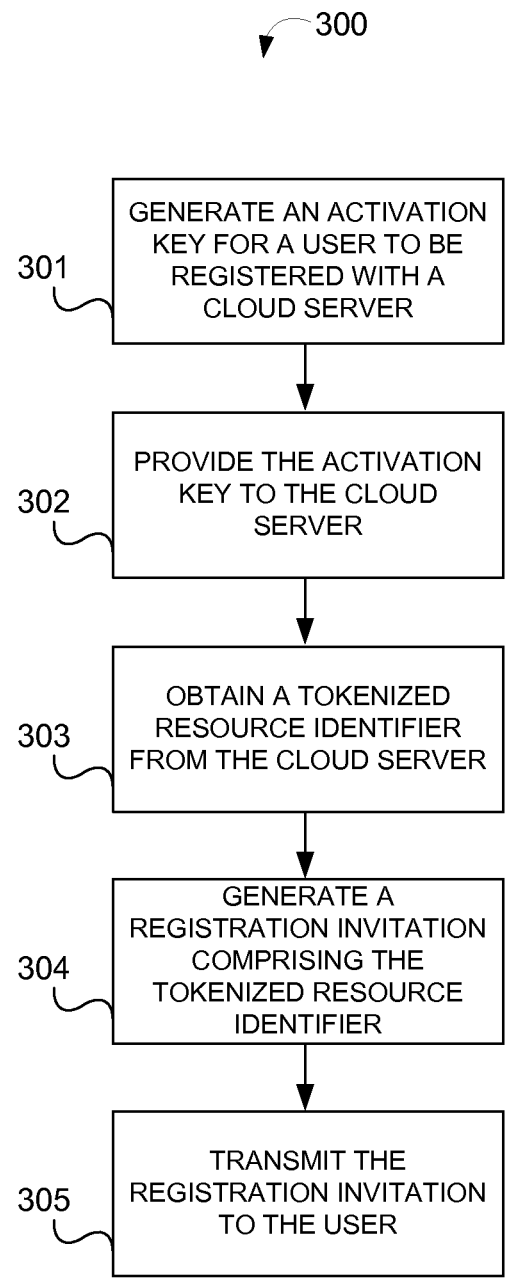
FIG. 3 illustrates a process for registering a user with a cloud-based system, according to an aspect of the invention.

FIG. 3 illustrates a process 300 for registering a user with a cloud-based system, according to an aspect of the invention.

External service provider 151 may obtain registration information about a new user and registers the user with external service provider 151. For example, a clinician (or any other user involved in patient care) may provide registration information about a new patient including contact information, personal information, insurance information, and/or other information by entering the registration information into external service provider 151.

In an operation 301, process 300 may include generating an activation key that uniquely identifies the user to be registered with server 110.

In an operation 302, process 300 may include providing the registration information including the activation key to server 110 in order to pre-register the user with server 110. In some embodiments, the registration information (or any portion thereof) may be automatically transmitted to server 110. For example, once the registration information is entered into external service provider 151, external service provider 151 may provide an option to transmit the registration information (or any portion thereof) to server 110.

In an operation 303, process 300 may include obtaining a tokenized resource identifier from server 110. The tokenized resource identifier may be generated by server 110 based on the registration information obtained from external service provider 151. The tokenized resource identifier may identify the location of one or more resources in server 110. For example, the tokenized resource identifier may include a URL for a registration page where the registration page may be used to complete the registration process. The tokenized resource identifier may comprise a pre-registration token that may be used to grant access to the one or more resources (e.g., the registration page) in server 110. The pre-registration token may be generated based on the activation key and/or embedded in the resource identifier to create the tokenized resource identifier.

In an operation 304, process 300 may include generating a registration invitation that may include the tokenized resource identifier and/or a message instructing a recipient of the registration invitation to register with server 110.

In an operation 305, process 300 may include transmitting the registration invitation to the user. For example, the registration may be generated in an email format and sent to the email address associated with the user. When the prospective user receives the registration invitation, the user may click on the tokenized URL included in the invitation and/or may be redirected to the location of one or more resources (e.g., the registration page) in server 110 to complete the registration process.

Figure 4:
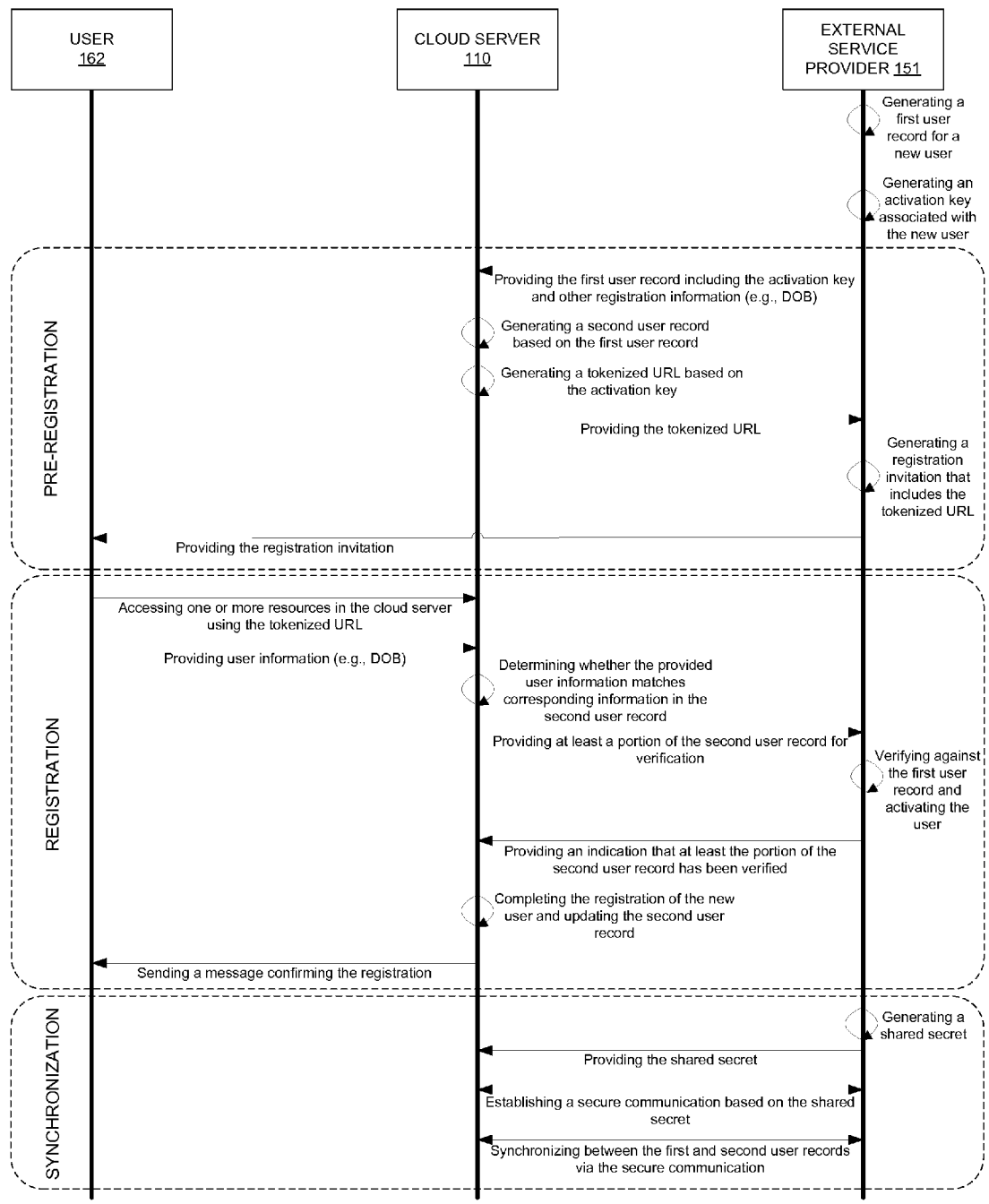
FIG. 4 illustrates a data flow diagram for a system for registering a user with a cloud-based system, according to an aspect of the invention.

FIG. 4 illustrates a data flow diagram for a system for registering a user with a cloud-based system, according to an aspect of the invention.

External service provider 151 may obtain registration information about a new user and/or creates a first user record associated with the user based on the registration information. For example, a clinician (or any other user involved in patient care) may provide registration information about a new patient including contact information, personal information, insurance information, and/or other information by entering the registration information into external service provider 151. External service provider 151 may create the first user record associated with the user based on the registration information received.

External service provider 151 may generate an activation key that uniquely identifies the user. The first user record including the registration information received and/or the activation key generated may be stored in a data storage coupled to external service provider 151.

The first user record (or any portion thereof) including the activation key and/or other registration information (e.g., DOB) may be provided to server 110 in order to pre-register the user with server 110. Once server 110 receives the first user record from external service provider 151, the first user record may be used to create a second user record associated with the new user where the second user record may be stored in user database 132 and/or other databases 134. A status associated with the second user record may indicate that the registration is incomplete (e.g., "pre-registered," "incomplete," "pending," "not activated," etc.). The status may be updated (e.g., changed to "complete," "activated," etc.) once the registration is fully completed.

Server 110 may generate a tokenized resource identifier (e.g., tokenized URI/URL) based on the activation key. The tokenized resource identifier may identify the location of one or more resources in server 110. For example, the tokenized resource identifier may include URL for a registration page where the registration page may be used to complete the registration process. The tokenized resource identifier may comprise a pre-registration token that may be used to grant access to the one or more resources (e.g., the registration page) in server 110. Server 110 may generate the pre-registration token based on the activation key and/or embed the token in the resource identifier to create the tokenized resource identifier.

Server 110 may provider the tokenized resource identifier to external service provider 151 which provided the first user record to pre-register the user with server 110. External service provider 151 may generate a registration invitation that may include the tokenized resource identifier and/or a message instructing a recipient of the registration invitation to register with server 110.

External service provider 151 may retrieve the contact information (e.g., email address) from the first user record and/or transmit, via a communication channel, the registration invitation from external service provider 151 to the user based on the contact information. For example, the registration invitation may be generated in an email format and transmitted (e.g., via a SMTP server) to the email address associated with the user.

When the prospective user receives the registration invitation, the user may click on the tokenized URL included in the invitation and/or may be redirected to the location of one or more resources (e.g., the registration page) in server 110 to complete the registration process.

The registration page, for example, may require the user to enter a particular portion of the registration information (such as his/her DOB, SSN, a phone number, an email address, an address, and/or other information that is unknown or not readily available to people other than the user) to ensure that the user entering the information is the correct user that should be registered. For example, the user may be asked to type in his/her DOB through the registration page.

Server 110 may determine whether the DOB matches the DOB stored in the second user record. In some embodiments, if the DOB matches the DOB stored in the second user record, then the user may be directed to a password page where the user may enter and/or confirm a new password for the login. If the DOB does not match the second user record, an error message may be generated and communicated to the user via the user interface.

In some embodiments, once the entered portion of the registration information has been verified against the second user record, the registration information in the second user record may be fully committed to user database 132 and/or the status associated with the second user record may be updated to indicate that the registration has been completed (e.g., the status changed to "completed," "activated," etc.).

Server 110 may provide at least a portion of the second user record to external service provider 151 to verify the at least a portion of the second user record against the first user record at external service provider 151. External service provider 151 may receive the at least a portion of the second user record and/or determine whether the at least a portion of the second user record matches a corresponding portion of the first user record. Once verified, external service provider 151 may generate an indication that the second user record has been verified against the first user record and/or transmit the indication to server 110. Server 110 may receive the indication and/or complete the registration process in response to the indication. The status associated with the second user record may be updated to indicate that the registration has been completed (e.g., the status changed to "completed," "activated," etc.) based on this indication.

Upon the completion of the registration process, server 110 may send a message confirming the completion of the registration to the user in the form of an email, an SMS/MMS message, a voice message, or any other suitable data transmission mechanism or communication format.

In some embodiments, server 110 may associate and/or pair the second user record with the first user record and/or store the association along with the second user record in user database 132 and/or other databases 134 such that the two records may be synchronized based on this association. In some embodiments, the association may be established and/or stored based on receiving the indication that the second user record has been successfully verified against the first user record from external service provider 151. In some embodiments, the association between the first user record and second user record may established at external service provider 151 and/or stored in a data storage coupled to external service provider 151. In some embodiments, the association may be established and/or stored based on verifying that the second user record has been successfully verified against the first user record.

In some embodiments, external service provider 151 may generate a shared secret that may be used to establish a secure communication between server 110 and external service provider 151. The secure communication established between server 110 and external service provider 151 may be bi-directional. The shared secret may be transmitted or otherwise provided to server 110.

The associated user records may be synchronized between server 110 and external service providers 151 via the secure communication established based on the shared secret. For example, health sessions and reminders that have been assigned by clinicians to a particular patient via external service provider 151 may be imported to server 110 if the user record of the particular patient has an association with a corresponding user record in user database 132. In another example, a particular patient may take vital sign measurements and health assessments via the web portal presented by server 110. The measurements and assessments may be uploaded to one or more external service providers 151 that have a user record associated with the particular patient in question.

FIG. 5 illustrates a screenshot of an interface for pre-registering a user with a cloud-based system, according to an aspect of the invention. The screenshots illustrated in FIG. 5 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting.

Interface 500 and other interfaces described herein may be implemented as a web page communicated from server 110 to a client, an application such as a mobile application executing on the client that receives generates the interface based on information communicated from server 110, and/or other interface. Whichever type of interface is used, server 110 may communicate the data and/or formatting instructions related to the interface to the client, causing the client to generate the various interfaces of FIG. 5 and other drawing figures. Furthermore, server 110 may receive data from the client via the various interfaces, as would be appreciated.

Referring to FIG. 5, interface 500 may include one or more data input elements that may be required by pre-registration module 113 to pre-register a new user with server 110. The one or more data input elements may include, for example, an activation key input element 510, a DOB input element 520, an email address input element 530, and/or other input elements. In one example, the activation key, DOB, and email address may be provided, via interface 500, to server 110 by manual input. In this example, the activation key that has been generated by external service provider 151 may be manually copied and pasted into activation key input element 510. The new user's DOB and email address may be entered into DOB input element 520 and email address input element 530, respectively. In another example, the one or more data input elements 510, 520, and/or 530 may be pre-populated with the registration information that has been transmitted from external service provider 151 to server 110.

Interface 500 may include a submit button 550 that, when clicked, pressed, or otherwise selected, may cause server 110 to create and/or generate a user record associated with the new user where the user record may be stored in user database 132 and/or other database 134. In some embodiments, a status associated with the user record may indicate that the registration is incomplete (e.g., "pre-registered," "incomplete," "pending," "not activated," etc.). The status may be updated (e.g., changed to "complete," "activated," etc.) once the registration is fully completed.

FIG. 6 illustrates a screenshot of an interface for registering a user with a cloud-based system, according to an aspect of the invention.

Interface 600 may include one or more data input elements that may be required by registration module 115 to complete the registration of the new user. The one or more data input elements may include, for example, a DOB input element 620 and/or other input elements. The registration page (as illustrated by interface 600) may require the user to enter a particular portion of the registration information (such as his/her DOB, SSN, a phone number, an email address, an address, and/or other information that is unknown or not readily available to people other than the user) to ensure that the user entering the information is the correct user that should be registered. For example, the user may be asked to input his/her DOB in DOB input element 620.

Interface 600 may include a submit button 650 that, when clicked, pressed, or otherwise selected, may cause server 110 to determine whether the DOB matches the DOB stored in the user record. In some embodiments, if the DOB matches the DOB stored in the second user record, then the user may be directed to a password page where the user may enter and/or confirm a new password for the login. If the DOB does not match the second user record, an error message may be generated and communicated to the user via a user interface.

FIG. 7 illustrates a screenshot of a registration invitation inviting the user to register with the cloud-based system, according to an aspect of the invention.

Interface 700 may include a destination address element 710, a message element 710, and/or a tokenized URL element 730. In some embodiments, external service provider 151 may generate the registration invitation and/or retrieve the contact information (e.g., email address) from the first user record and/or automatically populate destination address element 710 with the retrieved contact information. In other embodiments, pre-registration module 113 may generate the registration invitation and/or retrieve the contact information from the second user record.

Message element 710 may include a message instructing and/or inviting a recipient of the registration invitation to register with server 110. The message may include, for example, "Dear [User's Name], we are cordially inviting you to register with [Name of Service provided by server 110]. Please click on the following link to complete your registration." The tokenized resource identifier generated by pre-registration module 113 may be included in tokenized URL element 730.

Tokenized URL element 730 may be presented in the form of hyperlink which, when clicked or otherwise selected, may cause a web browser to open up on client device 161, and the user may be redirected to the registration page (as illustrated in FIG. 6) to complete the registration process. In some embodiments, the tokenized URL may also be directly entered into a web browser's address bar.

The various user interface components described herein may include hard (e.g., mechanical) or soft (e.g., touch screen or touch pad) buttons, text inputs, icons, selection lists, and/or other user interface objects that may be used to receive an input and/or provide an output. As used herein, the term "selection," "select," "selected," "selecting," "manipulation," "manipulating," etc. with respect to user interface components or members may include, for example, pressing a hard or soft button, clicking, highlighting, hovering over, or otherwise indicating an interest in executing one or more functions related to the selected user interface component.

In the Figures, like numerals represent equivalent elements or features. Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A non-transitory computer readable medium storing computer-readable instructions that, when executed by one or more processors of a cloud server, cause the cloud server to:
   obtain, by a pre-registration module, registration information associated with a user, wherein the registration information comprises an activation key;
   generate, by the pre-registration module, a tokenized resource identifier in a tokenized URL element based on the registration information, the tokenized resource identifier identifying the location of one or more resources in the cloud server, wherein the tokenized resource identifier comprises an embedded pre-registration token that is used to grant access to the one or more resources in the cloud server, the pre-registration token comprising the activation key used to verify the user and grant access to the one or more resources;
   provide, by the pre-registration module, the tokenized URL element with the tokenized resource identifier to the user in the form of a link;
   obtain, by a registration module, the pre-registration token embedded in the tokenized URL element with the tokenized resource identifier when the user accesses the one or more resources in the cloud server using the link;
   determine, by the registration module, whether to grant access to the one or more resources based on the pre-registration token by comparing and verifying the obtained pre-registration token from the registration module to the pre-registration token in generated tokenized resource identifier from the pre-registration module;
   grant, by the registration module, access to the one or more resources based on the determination and verification that access to the one or more resources should be granted based on the pre-registration token; and
   register, by the registration module, the user with the cloud server using the one or more resources.

2. The non-transitory computer readable medium of claim 1, the non-transitory computer readable medium further causing the cloud server to:
   generate, by the pre-registration module, the pre-registration token based on the activation key.

3. The non-transitory computer readable medium of claim 1, wherein the registration information further comprises contact information, the contact information comprising an email address or a phone number.

4. The non-transitory computer readable medium of claim 3, wherein providing the tokenized resource identifier to the user further comprises:
   generating, by the pre-registration module, a registration invitation, wherein the registration invitation includes the tokenized source identifier; and
   transmitting, by the pre-registration module, via a communication channel, the registration invitation to the user based on the contact information.

5. The non-transitory computer readable medium of claim 1, the non-transitory computer readable medium further causing the cloud server to:
   generate, by a user account module, a user record associated with the user based on the registration information, wherein a status associated with the user record indicates that the registration is incomplete; and
   update, by the user account module, the user record based on registering the user with the cloud server using the one or more resources.

6. The non-transitory computer readable medium of claim 5, wherein the registration information further comprises first user information and wherein registering the user with the cloud server using the one or more resources further comprises:
   obtaining, by the registration module, second user information;
   determining, by the registration module, whether the second user information matches the first user information in the user record; and
   registering, by the registration module, the user with the cloud server using the one or more resources based on the determination that the second user information matches the first user information in the user record.

7. The non-transitory computer readable medium of claim 6, wherein the first and second user information comprise a date of birth, a social security number, a phone number, an email address, or an address.

8. The non-transitory computer readable medium of claim 5, wherein registering the user with the cloud server using the one or more resources further comprises:
   identifying, by a verification module, an external service provider that has generated the activation key;
   providing, by the verification module, at least a portion of the user record to the external service provider to verify the at least a portion of the user record against a corresponding user record stored in a data storage coupled to the external service provider;
   receiving, by the verification module, an indication that the at least a portion of the user record has been verified against the corresponding user record; and
   registering, by the registration module, the user with the cloud server based on the indication that the user record has been verified against the corresponding user record.

9. The non-transitory computer readable medium of claim 8, wherein registering the user with the cloud server using the one or more resources further comprises:
   updating, by the user account module, the status to indicate that the registration is complete based on the indication that the user record has been verified against the corresponding user record.

10. The non-transitory computer readable medium of claim 8, the non-transitory computer readable medium further causing the cloud server to:
    receive, by a synchronization module, a shared secret from the external service provider, the shared secret used to establish a secure communication between the cloud server and the external service provider; and
    synchronize, by a synchronization module, between the user record and the corresponding user record via the secure communication.

11. A method implemented in a computer that includes one or more processors configured to execute one or more computer program instructions, the method comprising:
    obtaining registration information associated with a user;
    generating an activation key associated with the user based on the registration information;

obtaining a tokenized resource identifier in a tokenized URL element that identifies the location of one or more resources in a cloud server, wherein the tokenized resource identifier comprises an embedded pre-registration token that is used to grant access to the one or more resources in the cloud server, the pre-registration token comprising the activation key used to authenticate the user and grant access to the one or more resources;

providing the tokenized URL element with the tokenized resource identifier and embedded pre-registration token to the user in the form of a link;

granting access to the one or more resources when the user accesses the one or more resources using the link by authenticating the activation key of the pre-registration token; and registering the user using the one or more resources.

12. The method of claim 11, the method further comprising:

obtaining contact information associated with the user, the contact information comprising an email address or a phone number.

13. The method of claim 12, wherein providing the tokenized resource identifier to the user further comprises:

generating a registration invitation, wherein the registration invitation includes the tokenized resource identifier; and transmitting, via a communication channel, the registration invitation to the user based on the contact information.

14. The method of claim 13, wherein the registration invitation comprises a message instructing a recipient of the registration invitation to register with the cloud server.

15. The method of claim 11, the method further comprising:

generating a first user record associated with the user, the first user record comprises the activation key, wherein a status associated with the first user record indicates that the registration is incomplete.

16. The method of claim 15, the method further comprising:

receiving at least a portion of a second user record associated with the user from the cloud server;

verifying the at least a portion of the second user record against the first user record; and providing, once verified, an indication that the at least a portion of the second user record has been verified to the cloud server.

17. The method of claim 16, the method further comprising:

registering the user with the external service provider based on verifying the at least a portion of the second user record against the first user record, wherein the status associated with the first user record is updated to indicate that the registration is complete.

18. A method implemented in a computer that includes one or more processors configured to execute one or more computer program instructions, the method comprising:

obtaining at least a portion of a first user record associated with a user, wherein the at least a portion of the first user record comprises an activation key generated by an external service provider;

generating a second user record based on the at least a portion of the first user record;

generating a tokenized resource identifier in a tokenized URL element based on the activation key, the tokenized resource identifier identifying the location of one or more resources in a cloud server, wherein the tokenized resource identifier comprises an embedded pre-registration token that is used to grant access to the one or more resources in the cloud server, the pre-registration token comprising the activation key used to verify the user and grant access to the one or more resources;

providing the tokenized URL element with the tokenized resource identifier to the user in the form of a link;

granting access to the user who uses the link with the tokenized resource identifier to access the one or more resources in the cloud server;

providing at least a portion of the second user record to the external service provider to verify the at least a portion of the second user record against the first user record stored in a data storage coupled to the external service provider;

receiving an indication that the at least a portion of the second user record has been verified against the first user record; and registering the user with the cloud server based on the indication.

* * * * *